United States Patent
Wang et al.

(10) Patent No.: US 9,655,371 B2
(45) Date of Patent: May 23, 2017

(54) AUTOMATICALLY-LIMITING ELECTRIC SAUSAGE FILLER AND CONTROL METHOD THEREOF

(71) Applicant: INTRADIN (SHANGHAI) MACHINERY CO., LTD., Shanghai (CN)

(72) Inventors: Junliang Wang, Shanghai (CN); Shengyue Pan, Shanghai (CN); Ying Xu, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 0 days.

(21) Appl. No.: 14/900,886

(22) PCT Filed: Nov. 13, 2014

(86) PCT No.: PCT/CN2014/000997
§ 371 (c)(1),
(2) Date: Dec. 22, 2015

(87) PCT Pub. No.: WO2016/041103
PCT Pub. Date: Mar. 24, 2016

(65) Prior Publication Data
US 2016/0366899 A1    Dec. 22, 2016

(30) Foreign Application Priority Data

Sep. 15, 2014   (CN) .......................... 2014 1 0467291

(51) Int. Cl.
*A22C 11/00* (2006.01)
*A22C 11/02* (2006.01)
(Continued)

(52) U.S. Cl.
CPC ........... *A22C 11/0245* (2013.01); *A22C 11/04* (2013.01); *H02P 7/00* (2013.01); *H02P 7/03* (2016.02); *H02P 29/027* (2013.01)

(58) Field of Classification Search
CPC . A22C 11/00; A22C 11/0204; A22C 11/0245; A22C 11/06; A22C 11/08;
(Continued)

(56) References Cited

U.S. PATENT DOCUMENTS 1,666,631 A * 4/1928 Schmidt ................. A22C 11/02
452/43
2,234,585 A * 3/1941 Wilson ................... A22C 11/04
222/386

(Continued)

*Primary Examiner* — Richard Price, Jr.
(74) *Attorney, Agent, or Firm* — Kile Park Reed & Houtteman PLLC

(57) ABSTRACT

The invention relates to an automatically-limiting electric sausage filler and control methods thereof. A piston is positioned at the tail end of a toothed piston rod and integrated as a whole; a DC motor drives an automatic shaft, the automatic shaft is meshed with the toothed piston rod through a gear train to drive the toothed piston rod to move up and down in a material cylinder, a meat outlet is formed at the bottom of the material cylinder, when the piston is arranged at the bottom of the material cylinder, the electric sausage filler has a lower limit; when the piston is arranged at the top of the material cylinder, the electric sausage filler has an upper limit; a lower limit signal detection element and an upper limit signal detection element are arranged on two sides of the toothed piston rod and correspond to an upper limit magnet strip and a lower limit magnet strip embedded on the toothed piston rod in an induction manner, and induction signals of the lower limit signal detection element and the upper limit signal detection element are sent to a control circuit which outputs a control signal to drive the DC motor to work. By virtue of the upper limit and the lower
(Continued)

limit, the electric sausage filler is controlled to automatically fill sausages, overcurrent protection function is added in the control circuit for protecting the motor from stalling, so that a motor stalling protection device is omitted, and the cost is reduced; the sausage filling operation is simplified by virtue of the upper limit and the lower limit; and by virtue of the movement of the piston, the sausage filling process is fully automatic.

7 Claims, 3 Drawing Sheets

(51) Int. Cl.
*A22C 11/04* (2006.01)
*H02P 7/00* (2016.01)
*H02P 7/03* (2016.01)
*H02P 29/024* (2016.01)

(58) Field of Classification Search
CPC ...... H02P 7/00; H02P 7/02; H02P 7/03; H02P 29/00; H02P 29/291
USPC ...... 452/30, 31, 35, 40, 42, 43; 99/348, 467, 99/471, 472, 477; 426/486; 222/152, 222/269, 270, 275
See application file for complete search history.

(56) References Cited

U.S. PATENT DOCUMENTS

| | | | | |
|---|---|---|---|---|
| 3,601,845 A * | 8/1971 | Mavrich | ................ | A22C 11/06 222/309 |
| 3,670,362 A * | 6/1972 | Hughes | .................. | A22C 11/06 425/129.1 |
| 5,014,882 A * | 5/1991 | Dennis | ...................... | B65B 3/32 222/148 |
| 5,083,507 A * | 1/1992 | Van Haren | ............. | A22C 11/06 222/152 |
| 6,309,293 B1 * | 10/2001 | Zinser | .................... | A22C 11/08 452/40 |
| 6,321,642 B1 * | 11/2001 | Ou-Young | ............. | A23P 20/25 452/42 |
| 7,144,316 B1 * | 12/2006 | Chen | .................. | A22C 11/0209 452/44 |

* cited by examiner

AUTOMATICALLY-LIMITING ELECTRIC SAUSAGE FILLER AND CONTROL METHOD THEREOF

FIELD OF THE INVENTION

The invention relates to a sausage filling device, in particular to an automatically-limiting electric sausage filler and control methods thereof.

DESCRIPTION OF THE RELATED ART

Sausage fillers are a commonly used product among food machinery. In the past, manual sausage fillers are mostly used. Screw rods are driven by gear transmission to drive pistons to extrude minced meat in sausage casings, thus processing sausages and hams of different thicknesses. But because the handle of each sausage filler has to be cranked manually, it is inconvenient to fill sausages by one person, and two persons are required. A electric sausage filler of which the motor is controlled by a foot switch to drive the gear to work is now commercially available. It has a speed control function, and realizes sausage filling by one person. When the piston works at the bottom of the stainless steel material cylinder, a mechanical protection structure shall be provided to prevent the motor from stalling, burning the motor due to overcurrent, when the piston arrives at the bottom of the material cylinder. Because of the introduction of the mechanical protection structure, the whole product structure is complicated, and the cost is too high. Another problem is that the foot switch can control the motor intermittently during sausage filling, that is, the motor operates when the foot switch is depressed, and stops when the foot switch is released. The foot switch does not work when the piston arrives at the bottom, the piston will move up after the motor reversing button is pressed. The stop button is pressed after the piston leaves the material cylinder, then the material cylinder can be taken out for cleaning. As hands are greasy after filling sausages, buttons will be covered with oil stains if they are operated by greasy hands, easily resulting in misoperation.

SUMMARY OF THE INVENTION

To address existing problems of electric sausage fillers, the invention provides an automatically limiting electric sausage filler and control methods thereof. By limiting the upper position and lower position of the piston automatically, the whole sausage filling process can be fully automatic without cooperation of hands and feet.

The technical solution of the invention is an automatically-limiting electric sausage filler, comprising a piston, an automatic shaft, a lower limit signal detection element, a lower limit magnet strip, a toothed piston rod, an upper limit signal detection element, a material cylinder, an upper limit magnet strip, a meat outlet, a DC motor and a control circuit; the piston is positioned at the tail end of the toothed piston rod and integrated as a whole, the DC motor drives the automatic shaft, the automatic shaft is meshed with the toothed piston rod through a gear train to drive the toothed piston rod to move up and down in the material cylinder, the meat outlet is formed at the bottom of the material cylinder, when the piston is arranged at the bottom of the material cylinder, the electric sausage filler has a lower limit; when the piston is arranged at the top of the material cylinder, the electric sausage filler has an upper limit; the lower limit signal detection element and the upper limit signal detection element are arranged on two sides of the toothed piston rod and correspond to the upper limit magnet strip and the lower limit magnet strip embedded on the toothed piston rod in an induction manner, and induction signals of the lower limit signal detection element and the upper limit signal detection element are sent to the control circuit which outputs a control signal to drive the DC motor to work.

The lower limit signal detection element and the upper limit signal detection element are of reed switches or Hall elements.

The control circuit comprises a signal input part, a signal processing circuit, a forward/reverse drive circuit, a speed control circuit, an overcurrent protection circuit and an overcurrent fault lamp, the input part comprises an up switch, a down switch, a lower limit signal detection element, an upper limit signal detection element, a stop switch and a speed control potentiometer, signals of the speed control potentiometer are input into the speed control circuit, and then the speed control circuit outputs a voltage signal to control the rotating speed of the DC motor through the forward/reverse drive circuit; the overcurrent protection circuit detects input current of the forward DC motor and outputs a control signal to the forward/reverse drive circuit, then the forward/reverse drive circuit controls the DC motor to stop, and the overcurrent protection circuit outputs a signal to the overcurrent fault lamp; signals of the up switch, the down switch, the lower limit signal detection element and the upper limit signal detection element are sent to the signal processing circuit for processing, then the signal processing circuit outputs a signal to the forward/reverse drive circuit to drive the DC motor to rotate forward, rotate reversely or stop.

A control method of the electric sausage filler is characterized in that signals of the speed control potentiometer are input into the speed control circuit, and then the speed control circuit outputs a voltage signal to control the rotating speed of the DC motor through the forward/reverse drive circuit;

the overcurrent protection circuit detects input current of the DC motor, and outputs a control signal to the forward/reverse drive circuit when the input current is higher than the current limit, the forward/reverse drive circuit controls the DC motor to stop, and the overcurrent protection circuit outputs a signal to light the overcurrent fault lamp up; when the fault lamp is on, the signal processing circuit locks and disables all operation keys after getting a fault signal from the overcurrent protection circuit, and the operation keys can be restored by pressing a stop switch reset button;

after the down switch is pressed, a signal is input into the signal processing circuit, then the signal processed by the signal processing circuit is input into the forward/reverse drive circuit, and the forward/reverse drive circuit drives the DC motor to rotate forward and drives the piston to move down; a lower limit signal is input into the signal processing circuit, then the processed signal is input into the forward/reverse drive circuit, the forward/reverse drive circuit drives the DC motor to rotate reversely and drives the piston to move up until an upper limit signal is input into the signal processing circuit, and the signal processing circuit outputs a stop signal to the forward/reverse drive circuit to control the DC motor to stop.

A control method of the electric sausage filler is characterized in that the control circuit further comprises a foot switch, a switch-on signal of the foot switch is input into the signal processing circuit, then the switch-on signal processed by the signal processing circuit is input into the forward/reverse drive circuit, and the forward/reverse drive circuit drives the DC motor to rotate forward and drives the piston to move down; a switch-off signal of the foot switch is input into the signal processing circuit, and then the signal processing circuit outputs a stop signal to the forward/reverse drive circuit.

The beneficial effects of the invention are as follows: the automatically limiting electric sausage filler and control methods thereof of the invention help omit a motor stalling protection device and reduce the cost, the sausage filling operation is simplified by virtue of the upper limit and the lower limit; by virtue of the movement of the piston, the sausage filling process is fully automatic.

DESCRIPTION OF THE PREFERRED EMBODIMENT

Figure 1:
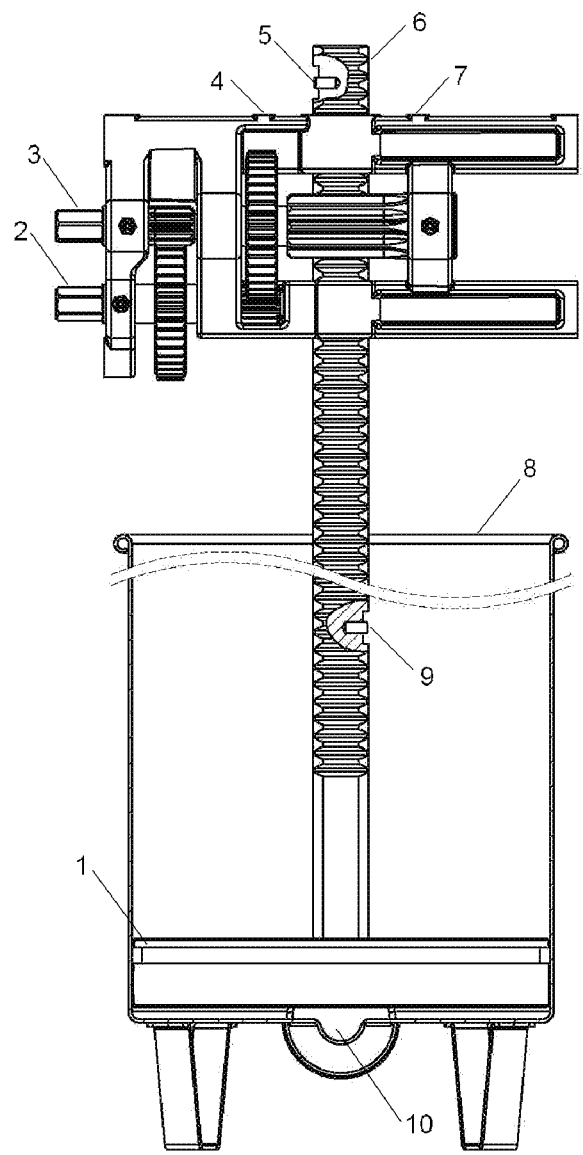
FIG. 1 is a structural diagram of the automatically limiting electric sausage filler of the invention.
Figure 2:
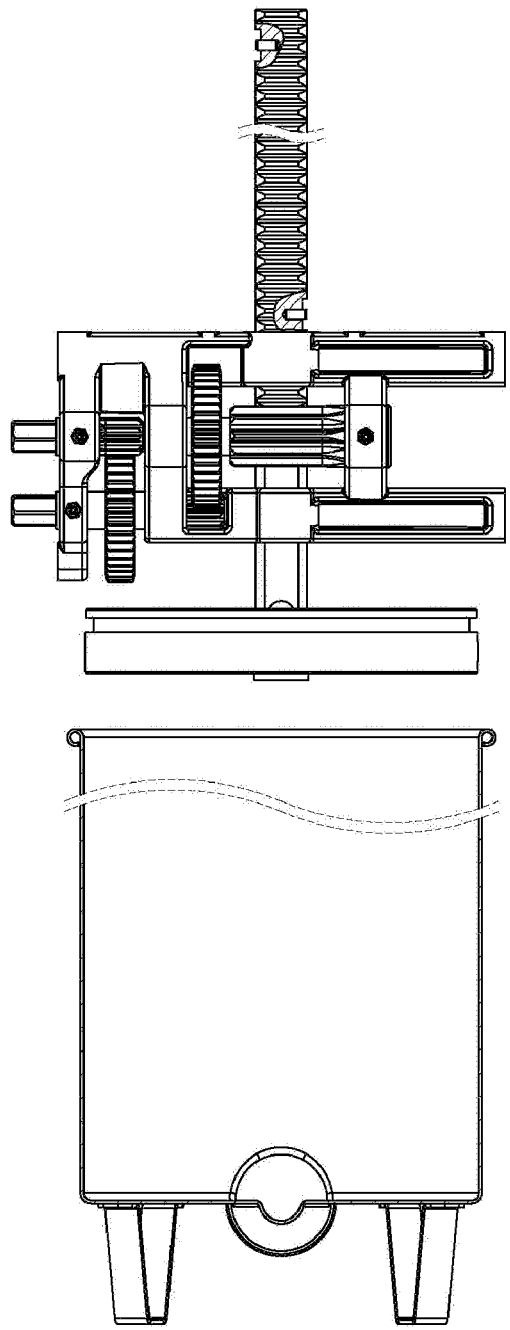
FIG. 2 is an after-work state diagram of the automatically limiting electric sausage filler of the invention.

As shown in the structural diagram of the automatically limiting electric sausage filler in FIG. 1, besides the control circuit, the automatically limiting electric sausage filler further comprises a piston (1), a manual shaft (2), an automatic shaft (3), a lower limit signal detection element (4), a lower limit magnet strip (5), a toothed piston rod (6), an upper limit signal detection element (7), a material cylinder (8), an upper limit magnet strip (9) and a meat outlet (10); the piston (1) is positioned at the tail end of the toothed piston rod (6) and integrated as a whole, the manual shaft (2) or the automatic shaft (3) is meshed with the toothed piston rod (6) through a gear train, and the manual shaft (2) or the automatic shaft (3) is perpendicular to the toothed piston rod (6) to drive the toothed piston rod (6) to move up and down in the material cylinder (8), when the toothed piston rod (6) moves down, meat in the material cylinder (8) is extruded out of the meat outlet (10), a sausage casing is connected at the meat outlet (10) for sausage filling; when the piston (1) arrives at the bottom of the material cylinder (8), the manual shaft (2) or the automatic shaft (3) is used to drive the toothed piston rod (6) to move up in the material cylinder (8), and the piston (1) leaves the material cylinder (8), as shown in FIG. 2, the material cylinder (8) can be taken out for cleaning or adding meat. The manual shaft (2) drives the gear by cranking the handle, and the automatic shaft (3) drives the gear by the DC motor.

In the invention, to limit the up and down movement positions of the piston (1) of the electric sausage filler, the lower limit magnet strip (5) and the upper limit magnet strip (9) are embedded on the toothed piston rod (6), and the lower limit signal detection element (4) and the upper limit signal detection element (7) are arranged on two sides of the toothed piston rod (6). When the DC motor drives the automatic shaft (3) to drive the toothed piston rod (6) to move down to the bottom of the piston (1), the lower limit magnet strip (5) at the upper part of the toothed piston rod (6) is induced by the lower limit signal detection element (4), as shown in FIG. 1, the lower limit signal detection element (4) sends signals to the control circuit, the control circuit controls the DC motor to stop, then the control circuit outputs a reverse signal to drive the DC motor, and the DC motor drives the automatic shaft (3) reversely to drive the toothed piston rod (6) to move up. After moving to the upper limit magnet strip (9) at the lower part of the toothed piston rod (6), the toothed piston rod (6) is induced by the upper limit signal detection element (7). After the control circuit receives the signal from the upper limit signal detection element (7), the motor stops running, as shown in FIG. 2.

Figure 3:
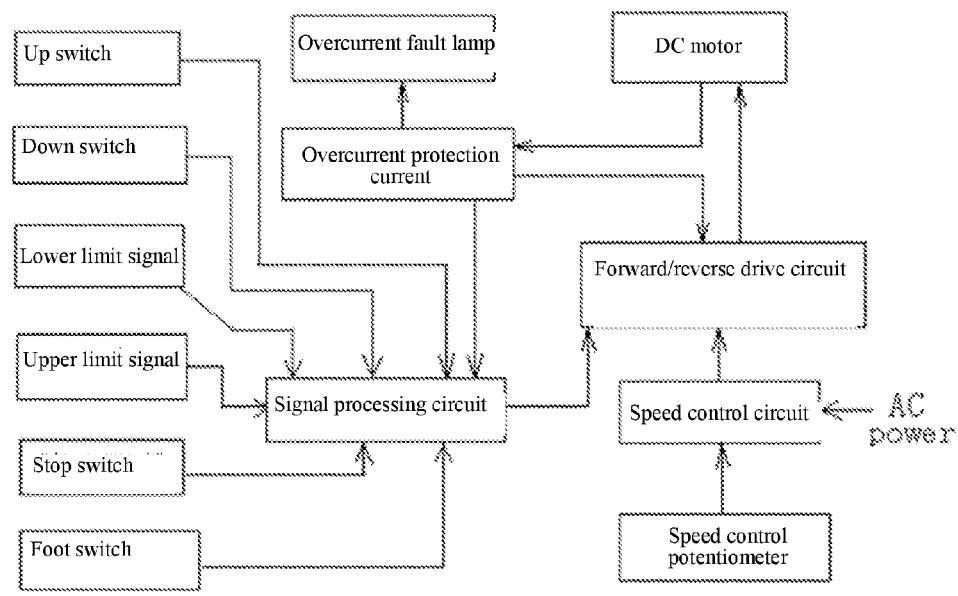
FIG. 3 is a control circuit block diagram of the automatically limiting electric sausage filler of the invention.

As shown in the control circuit block diagram of the automatically limiting electric sausage filler in FIG. 3, the control circuit comprises a signal input part, a signal processing circuit, a forward/reverse drive circuit, a speed control circuit, an overcurrent protection circuit and an overcurrent fault lamp, the input part comprises an up switch, a down switch, a lower signal detection element (4), an upper signal detection element (7), a stop switch, a foot switch and a speed control potentiometer, signals of the speed control potentiometer are input into the speed control circuit, and then the speed control circuit outputs a voltage signal to control the rotating speed of the DC motor through the forward/reverse drive circuit; the overcurrent protection circuit detects input current of the DC motor, and outputs a control signal to the forward/reverse drive circuit when the input current is higher than the current limit, the forward/reverse drive circuit controls the DC motor to stop, and the overcurrent protection circuit outputs a signal to light the overcurrent fault lamp up; when the fault lamp is on, the signal processing circuit disables all operation keys after getting a fault signal from the overcurrent protection circuit, and the operation keys can be restored by pressing a stop switch reset button to prevent misoperation by others. The operator can press the up switch after fault reset, then the piston (1) moves automatically up to the upper limit of the material cylinder (8), at this point, the material cylinder can be taken out to check if sausage filling is abnormal due to bones. In conventional sausage filling, after the down switch is pressed, a signal is input into the signal processing circuit, then the signal processed by the signal processing circuit is input into the forward/reverse drive circuit, and the forward/reverse drive circuit drives the DC motor to rotate forward and drives the piston to move down; a lower limit signal is input into the signal processing circuit, then the processed signal is input into the forward/reverse drive circuit, the forward/reverse drive circuit drives the DC motor to rotate reversely and drives the piston to move up until an upper limit signal is input into the signal processing circuit, and the signal processing circuit outputs a stop signal to the forward/reverse drive circuit to control the DC motor to stop. A switch-on signal of the foot switch is input into the signal processing circuit, then the switch-on signal processed by the signal processing circuit is input into the forward/reverse drive circuit, and the forward/reverse drive circuit drives the DC motor to rotate forward and drives the piston to move down; a switch-off signal of the foot switch is input into the signal processing circuit, and then the signal processing circuit outputs a stop signal to the forward/reverse drive circuit. The automatically limiting electric sausage filler is suitable for operators unfamiliar with operation, and operation can be stopped at any time. The lower limit signal detection element (4) and the upper limit signal detection element (7) used can be of reed switches or Hall elements, and can output a switching signal or voltage signal after inducting magnetic signals.

What is claimed is:

1. An automatically-limiting electric sausage filler, characterized by comprising a piston, an automatic shaft, a lower limit signal detection element, a lower limit magnet strip, a toothed piston rod, an upper limit signal detection element, a material cylinder, an upper limit magnet strip, a meat outlet, a DC motor and a control circuit, wherein the piston is positioned at the tail end of the toothed piston rod and integrated as a whole, the DC motor drives the automatic shaft, the automatic shaft is meshed with the toothed piston rod through a gear train to drive the toothed piston rod to move up and down in the material cylinder, the meat outlet is formed at the bottom of the material cylinder, when the piston is arranged at the bottom of the material cylinder, the electric sausage filler has a lower limit; when the piston is arranged at the top of the material cylinder, the electric sausage filler has an upper limit; the lower limit signal detection element and the upper limit signal detection element are arranged on two sides of the toothed piston rod and correspond to the upper limit magnet strip and the lower limit magnet strip embedded on the toothed piston rod in an induction manner, and induction signals of the lower limit signal detection element and the upper limit signal detection element are sent to the control circuit which outputs a control signal to drive the DC motor to work.

2. The automatically-limiting electric sausage filler of claim 1, characterized in that the lower limit signal detection element and the upper limit signal detection element are of reed switches or Hall elements.

3. The automatically-limiting electric sausage filler of claim 2, characterized in that signals of the speed control potentiometer are input into the speed control circuit, and then the speed control circuit outputs a voltage signal to control the rotating speed of the DC motor through the forward/reverse drive circuit;

the overcurrent protection circuit detects input current of the DC motor, and outputs a control signal to the forward/reverse drive circuit when the input current is higher than the current limit, the forward/reverse drive circuit controls the DC motor to stop, and the overcurrent protection circuit outputs a signal to light the overcurrent fault lamp up; when the fault lamp is on, the signal processing circuit locks and disables all operation keys after getting a fault signal from the overcurrent protection circuit, and the operation keys can be restored by pressing a stop switch reset button;

after the down switch is pressed, a signal is input into the signal processing circuit, then the signal processed by the signal processing circuit is input into the forward/reverse drive circuit, and the forward/reverse drive circuit drives the DC motor to rotate forward and drives the piston to move down; a lower limit signal is input into the signal processing circuit, then the processed signal is input into the forward/reverse drive circuit, the forward/reverse drive circuit drives the DC motor to rotate reversely and drives the piston to move up until an upper limit signal is input into the signal processing circuit, and the signal processing circuit outputs a stop signal to the forward/reverse drive circuit to control the DC motor to stop.

4. The automatically-limiting electric sausage filler of claim 1, characterized in that the control circuit comprises a signal input part, a signal processing circuit, a forward/reverse drive circuit, a speed control circuit, an overcurrent protection circuit and an overcurrent fault lamp, the input part comprises an up switch, a down switch, a lower limit signal detection element, an upper limit signal detection element, a stop switch and a speed control potentiometer, signals of the speed control potentiometer are input into the speed control circuit, and then the speed control circuit outputs a voltage signal to control the rotating speed of the DC motor through the forward/reverse drive circuit; the overcurrent protection circuit detects input current of the forward DC motor and outputs a control signal to the forward/reverse drive circuit, then the forward/reverse drive circuit controls the DC motor to stop, and the overcurrent protection circuit outputs a signal to the overcurrent fault lamp; signals of the up switch, the down switch, the lower limit signal detection element and the upper limit signal detection element are sent to the signal processing circuit for processing, then the signal processing circuit outputs a signal to the forward/reverse drive circuit to drive the DC motor to rotate forward, rotate reversely or stop.

5. The automatically-limiting electric sausage filler of claim 4, characterized in that signals of the speed control potentiometer are input into the speed control circuit, and then the speed control circuit outputs a voltage signal to control the rotating speed of the DC motor through the forward/reverse drive circuit;

the overcurrent protection circuit detects input current of the DC motor, and outputs a control signal to the forward/reverse drive circuit when the input current is higher than the current limit, the forward/reverse drive circuit controls the DC motor to stop, and the overcurrent protection circuit outputs a signal to light the overcurrent fault lamp up; when the fault lamp is on, the signal processing circuit locks and disables all operation keys after getting a fault signal from the overcurrent protection circuit, and the operation keys can be restored by pressing a stop switch reset button;

after the down switch is pressed, a signal is input into the signal processing circuit, then the signal processed by the signal processing circuit is input into the forward/reverse drive circuit, and the forward/reverse drive circuit drives the DC motor to rotate forward and drives the piston to move down; a lower limit signal is input into the signal processing circuit, then the processed signal is input into the forward/reverse drive circuit, the forward/reverse drive circuit drives the DC motor to rotate reversely and drives the piston to move up until an upper limit signal is input into the signal processing circuit, and the signal processing circuit outputs a stop signal to the forward/reverse drive circuit to control the DC motor to stop.

6. The automatically-limiting electric sausage filler of claim 1, characterized in that signals of the speed control potentiometer are input into the speed control circuit, and then the speed control circuit outputs a voltage signal to control the rotating speed of the DC motor through the forward/reverse drive circuit;

the overcurrent protection circuit detects input current of the DC motor, and outputs a control signal to the forward/reverse drive circuit when the input current is higher than the current limit, the forward/reverse drive circuit controls the DC motor to stop, and the overcurrent protection circuit outputs a signal to light the overcurrent fault lamp up; when the fault lamp is on, the signal processing circuit locks and disables all operation keys after getting a fault signal from the overcurrent protection circuit, and the operation keys can be restored by pressing a stop switch reset button;

after the down switch is pressed, a signal is input into the signal processing circuit, then the signal processed by the signal processing circuit is input into the forward/reverse drive circuit, and the forward/reverse drive circuit drives the DC motor to rotate forward and drives the piston to move down; a lower limit signal is input into the signal processing circuit, then the processed signal is input into the forward/reverse drive circuit, the forward/reverse drive circuit drives the DC motor to rotate reversely and drives the piston to move up until an upper limit signal is input into the signal processing circuit, and the signal processing circuit outputs a stop signal to the forward/reverse drive circuit to control the DC motor to stop.

7. A control method of the automatically-limiting electric sausage filler of claim 6, characterized in that the control circuit further comprises a foot switch, a switch-on signal of the foot switch is input into the signal processing circuit, then the switch-on signal processed by the signal processing circuit is input into the forward/reverse drive circuit, and the forward/reverse drive circuit drives the DC motor to rotate forward and drives the piston to move down; a switch-off signal of the foot switch is input into the signal processing circuit, and then the signal processing circuit outputs a stop signal to the forward/reverse drive circuit.

\* \* \* \* \*